United States Patent [19]
Bacher et al.

[11] Patent Number: 5,536,154
[45] Date of Patent: Jul. 16, 1996

[54] APPARATUS FOR TREATING THERMOPLASTIC SYNTHETIC PLASTICS MATERIAL

[76] Inventors: Helmut Bacher, Bruck/Hausleiten 17; Helmuth Schulz, Badstrasse 20, both of St. Florian, A-4490, Austria, A-4490; Georg Wendelin, Waldbothenweg 84, Linz, Austria, A-4033

[21] Appl. No.: 256,118

[22] PCT Filed: Mar. 16, 1993

[86] PCT No.: PCT/AT93/00051

§ 371 Date: Jun. 23, 1994

§ 102(e) Date: Jun. 23, 1994

[87] PCT Pub. No.: WO93/18902

PCT Pub. Date: Sep. 30, 1993

[30] Foreign Application Priority Data

Mar. 19, 1992 [AT] Austria ............................. 563/92

[51] Int. Cl.⁶ .................................................. A21C 11/10
[52] U.S. Cl. ...................... 425/302.1; 241/101.2; 241/186.3; 264/140; 425/305.1; 425/306
[58] Field of Search ................ 425/302.1, 305.1, 425/306, 815; 264/140, DIG. 69; 241/101.2, 186.3, 186.5

[56] References Cited

U.S. PATENT DOCUMENTS

| | | | |
|---|---|---|---|
| 4,222,728 | 9/1980 | Bacher et al. | 425/305.1 |
| 4,243,625 | 1/1981 | Burge | 264/DIG. 69 |
| 4,460,277 | 7/1984 | Schulz et al. | 425/305.1 |
| 4,968,463 | 11/1990 | Levasseur | 264/DIG. 69 |
| 5,017,110 | 5/1991 | Wanek et al. | 425/302.1 |
| 5,225,137 | 7/1993 | Sadr | 264/DIG. 69 |

FOREIGN PATENT DOCUMENTS

| | | |
|---|---|---|
| 74346 | 3/1983 | European Pat. Off. . |
| 303929 | 2/1989 | European Pat. Off. . |
| 321742 | 6/1989 | European Pat. Off. . |
| 496080 | 7/1992 | European Pat. Off. . |
| 89/07042 | 8/1989 | WIPO . |

*Primary Examiner*—Timothy McMahon

[57] ABSTRACT

An apparatus for pre-treatment of thermoplastic synthetic plastics material, for example polyester waste, comprises at least two receptacles (1,13) disposed in series following each other, in each one of which receptacles a comminuting or mixing tool (5) rotates around a vertical axis (4) in the bottom region of the receptacle (1 or 13). At least the downstream receptacle has an evacuation line (18) through which, optionally also a protective gas can be introduced. The receptacles (1,13) are connected to each other by a tube piece (12) in which a shut-off means (20) is disposed so that the vacuum in the downstream receptacle (13) can be maintained without any problem until the shut-off valve (20) is opened, whereupon the vacuum in the receptacle (13) sucks on the material positioned in the upstream receptacle (1). Therefore, in the upstream receptacle (1)—when seen in flowing direction of the synthetic plastics material—the synthetic plastics material is pre-comminuted, pre-heated, pre-dried and pre-compressed, what is still assisted by the turbulence when sucked-in into the downstream receptacle (13). In such a manner, completely homogeneous material is conveyed by a worm (16) connected to the last receptacle (13) to further processing (FIG. 1).

20 Claims, 1 Drawing Sheet

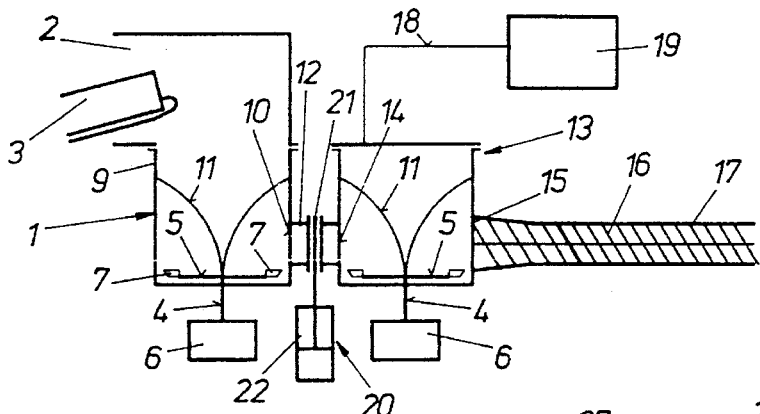
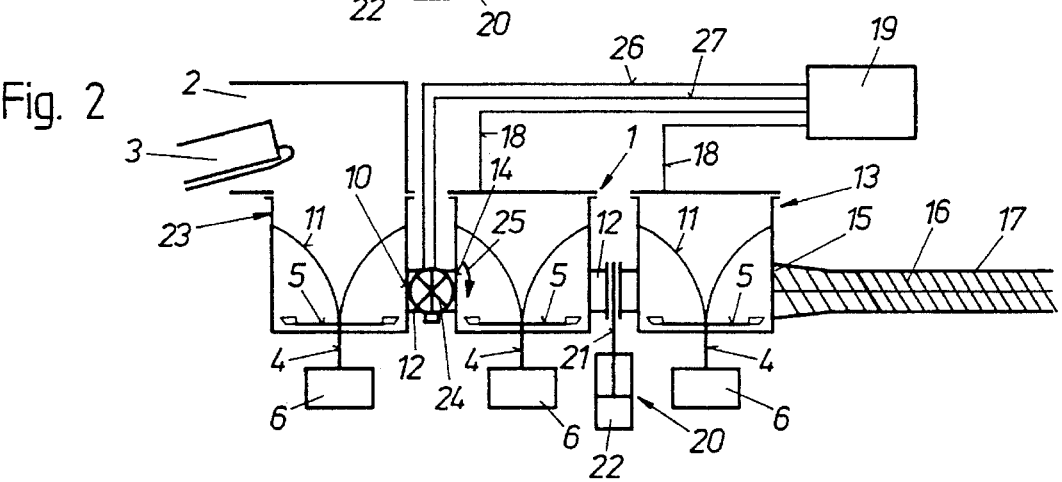
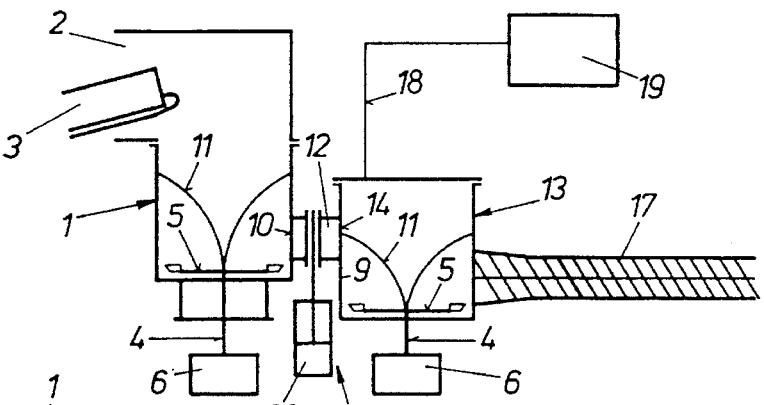
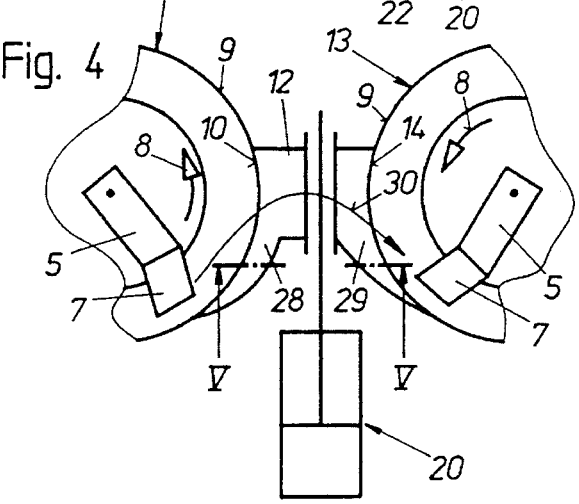
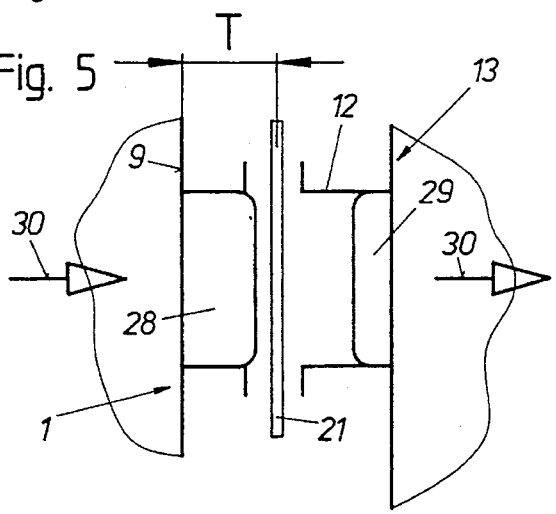

APPARATUS FOR TREATING THERMOPLASTIC SYNTHETIC PLASTICS MATERIAL

BACKGROUND AND SUMMARY OF THE INVENTION

The invention relates to an apparatus for treating thermoplastic synthetic plastics material, for example waste, in particular of polyester, comprising a receptacle for material to be treated to which this material is supplied through an intake opening and from which the material is delivered by at least one worm connected to the sidewall of the receptacle, at least one tool having working edges acting comminuting and, respectively, or mixing on the material disposed in the bottom region of the receptacle and being rotatable around a vertical axis, the intake opening of the worm being disposed at least substantially at the level of the tool, and at least one line connected to the receptacle for creating a vacuum within the interior of the receptacle and, if desired, for supplying a gas therein.

Such apparatus are known (EP-A 390,873), and generally they work satisfying, also when treating such kinds of synthetic plastics material which are sensitive to air oxygen and, respectively, or humidity, because by evacuating the receptacle or by supplying a protective gas into the interior of the receptacle, the synthetic plastics material can be protected against these detrimental influences.

However, it has been shown that in some cases the degree of homogenizing of the synthetic plastics material delivered by the worm is not sufficient, in particular with respect to the obtained drying degree of such synthetic plastics material which must be completely dry already before plasticizing in order to avoid downgrading, for example polyester. Polyester elements, for example foils of greater thickness, require an increased effort in drying which increases with the thickness so that for such material separate drying processes, for example with dehydrated air in special drying apparatus are required. Further, these drying apparatus operate in a temperature region that is admissible for crystalized material only, however, amorphous material would get sticky so that it would agglomerate. This means that a crystallizing process must antecede the drying process. However, if the material to be treated is treated for a long time in the receptacle, then at a continuous operation of the apparatus there occurs the danger that single synthetic plastics material elements are already clutched by the delivery worm already at a very early moment, however other synthetic plastics material elements only at a very late time. Those synthetic plastics material elements which were taken along early, may still be comparatively cold and, therefore, not pre-treated to a sufficient amount, so that the said inhomogenities in the material occur that is supplied by the worm to the connected tool, for example to an extruder head.

The invention has at its object to avoid these disadvantages and to substantially improve the homogeneity of the delivered material, by using the vacuum effect within the receptacle in an advantageous manner. The invention solves this task by the features that the delivery opening of at least one further receptacle is connected to the intake opening by means of a tube element, in which receptacle also at least one tool rotating around a vertical axis is disposed in the bottom region of the receptacle, and that in the tube element a shut-off means for pressure-tight closing of the tube element is disposed for maintaining the vacuum within the interior of the receptacle provided with the line. Therefore, within the inventive apparatus two or more receptacles are disposed in a series and the synthetic plastics material to be treated must run through these receptacles one after the other. Within the first receptacle, already a pre-treatment of the synthetic plastics material takes place by a pre-comminuting, pre-heating, pre-drying and pre-compression, so that pre-homogenized material is created which is supplied to the following receptacle. Thereby it is ensured that no untreated (cold, not compressed, not comminuted or inhomogeneous) material is directly supplied to the delivery worm and via this to the connected extruder or the like. By means of the shut-off means within the tube element connecting the receptacles, a complete and reliable tightening between the two receptacles can be obtained so that losses in the vacuum or in the protective gas within the following receptacle are completely avoided as long as the shut-off means remains closed, that is, as long as the pre-treatment takes place within the preceding receptacle. Therefore, the advantages of the pre-treatment can be maintained also if within the second or within a following receptacle a vacuum treatment or protective gas treatment of the thermo-plastic synthetic material takes place. The vacuum of this treatment is even used for an increase of the mixing effect and, therefore, for improving the homogenity of the material delivered from the downstream disposed receptacle, because, when the shut-off means is opened, the vacuum within the downstream receptacle suddenly sucks on the material disposed within the upstream receptacle so that an abrupt mixing takes place within the downstream receptacle by vacuum influence.

Particularly favourable results are obtained if according to a further embodiment of the invention the exit opening of the further receptacle (that is the upstream receptacle) is disposed at least substantially at the level of the tool within this receptacle, that is within the bottom region of the receptacle, because then the said sucking-off of the material disposed within the upstream receptacle can take place without a substantial deviation thereof. Further, if the shut-off valve is opened when the tool still rotates, the tool rotating within the upstream receptacle delivers by centrifugal action into the exit opening so that the material pre-treated within the upstream receptacle is conveyed into the downstream receptacle within the shortest possible time. As soon as the shut-off valve is closed again, a fresh batch can be introduced into the upstream receptacle and can be pre-treated there.

Within the EP-A 496,090, which has a better priority, however is not pre-published, is has been proposed to mount two receptacles provided with rotating comminuting tools for the treatment of synthetic plastics waste material in a series. The material is introduced into the second receptacle by means of a conveyor worm from the first receptacle. However, such a conveyor worm cannot be made pressure-tight.

Within the spirit of the invention, in the simplest case the shut-off means may comprise a gate plate which is closed as soon as the vacuum treatment or the gasification takes place within the downstream receptacle. However, then no continuous operation is still possible, to the contrary, the downstream receptacle must be charged batchwise. If, however, according to another embodiment of the invention the shut-off means is a sluice, in particular a cellular wheel sluice, the said tightening between the two receptacles is maintained and nevertheless a continuous operation is possible. In order to avoid that too great vacuum losses occur through the cells of the sluice, these cells can also be evacuated or a gas can be introduced therein.

As already mentioned, the vacuum created within the downstream receptacle enhances sucking-in of the material to be treated from the upstream receptacle. Within such plants, therefore, the receptacles as a rule can be disposed at the same level. However, if it is desired to improve filling of the downstream receptacle or mixing the material therein by influence of gravity, according to a further embodiment of the invention the receptacle disposed upstream, when seen in flowing direction of the material, may be disposed at a higher level than the following receptacle. The latter, therefore, can also be charged within its middle section or in its upper section of its sidewall, and optionally also through the cover from above.

Within the spirit of the invention, it has been shown that it is particularly favourable to provide the exit opening of the, when seen in flowing direction of the material, upstream receptacle with an enlargement at the arriving side of the tool. This enlargement ensures that the material can better flow into the flow cross section. According to the invention, an analogous improvement is obtained at the exit side of the transition cross section, if the intake opening of the, when seen in flowing direction of the material, downstream receptacle has an enlargement at that side at which the tool runs off. Within the spirit of the invention, the enlargements may be of pocket-like configuration, preferably having a sickle-shaped cross section, in order to ensure a smooth introduction or delivery of the material into the receptacle or out of it.

BRIEF DESCRIPTION OF THE DRAWING FIGURES

In the drawing, exemplative embodiments of the invention are schematically shown. FIGS. 1, 2 and 3 each show a vertical section through different embodiments of the invention. FIG. 4 is a horizontal section showing the configuration of the pocket-shaped enlargements of the transition cross section. FIG. 5 is a section taken along the line V—V of FIG. 4.

DETAILED DESCRIPTION OF THE PREFERRED EMBODIMENTS

Within the embodiment according to FIG. 1 a first receptacle 1 is provided to which the thermoplastic synthetic plastics material to be treated, for example waste polyester in form of foil remnants, used articles (for example bottles) and the like is continuously supplied through an intake opening 2 by means of a conveyor 3. A tool 5 rotatable around a vertical axis 4 is disposed in the bottom region of the receptacle 1 and is driven for rotation by a motor 6 and comminutes and mixes the synthetic plastics material within the receptacle 1. For this, the tool 5 comprises at least two arms which extend perpendicularly to the axis 4 and are provided with working edges 7 acting on the synthetic plastics material. When seen in rotation direction (arrow 8, FIG. 4) of the tool 5, these working edges 7 are angle-bent so that, on the one hand, they exert a drawing cut on the synthetic plastics material disposed in the marginal area of the receptacle 1 and, on the other hand, convey the comminuted material like a spatula into a delivery opening 10 disposed in the sidewall 9 of the receptacle, which opening is substantially disposed at the same level as the tool 5. The synthetic plastics material rotating within the receptacle 1 arises along the sidewalls 9 of the receptacle 1 and forms a mixing trombe, the shape of which depends from the kind, the quantity and the velocity of the material. A two-part tube element 12 comprising a shut-off member 20 is connected to the discharge opening 10, through which tube element the pre-comminuted material expelled from the receptacle 1 reaches a further receptacle 13, provided that the shut-off means 20 is opened, which further receptacle is disposed at the same level as the receptacle 1 and in which further receptacle a tool 5 driven by a motor 8 for rotation is disposed which is constructed in the same manner as the tool of the receptacle 1 and is disposed at the same level as the intake opening 14 formed by the mouth of the tube element 12. The pre-comminuted material introduced through this opening 15 into the receptacle 13 is taken along by the rotating tool 5 and forms also a mixing trombe 11 in the receptacle 13. Hereby the synthetic plastics material is further comminuted and homogenized and lastly is conveyed by the tool 5 in the intake opening 15 of a worm. 16, the housing 17 thereof suitably is disposed at least substantially radially with respect to the axis of the receptacle 13. Suitably, the housing 17 is funnel-like enlarged in the area of the intake opening 15, in order to facilitate the introduction of the material. The intake opening 15 is disposed at least substantially at the level of the tool 5. The worm 16 conveys the treated synthetic plastics material to a plant (not shown) connected to the apparatus, for example to a worm extruder, or the worm 16 may constitute the worm of this worm extruder.

For the treatment of such synthetic plastics material which in heated condition is sensitive to air access or in order to reduce the drying time, a line 18 opens into the receptacle 13 and is connected to a means 19 for creating a vacuum within the receptacle 13 or, respectively, for introduction of a protective gas into this receptacle 13. Maintenance of the desired atmosphere or of the desired pressure within the receptacle 13 is ensured by the shut-off member 20 mounted in the tube element 12, what is facilitated by a two-part construction of the tube element 12. In the exemplative embodiment shown, this shut-off means 20 is formed by a gate plate 21 connected to the piston rod of a pressurized cylinder 22. This gate 21 tightens the receptacle 13 completely with respect to the receptacle 1.

The embodiment according to FIG. 2 differs from that according to FIG. 1 mainly in that a third receptacle 23 is provided upstream the receptacle 1 and the discharge opening 10 of which is connected to the intake opening 14 of the receptacle 1. Comminuting, heating, drying and compression of the treated synthetic plastics material for the purpose of its homogenisation is made in three steps here. Lines 18 are again conducted into the last two receptacles 1,13 for evacuation of the receptacles or introducing gases into them. The first two receptacles 23,1, when seen in flowing direction of the material, may again be connected by means of a tube element 12 in which, as this is shown in FIG. 1, a shut-off means 20 formed by a gate valve may be inserted, as this is also shown in FIG. 2 for the tube piece 12 connecting the two receptacles 1,13. Since the shut-off by means of a shut-off device in form of a gate valve does not enable a completely continuous operation, the shut-off means 20 in the tube piece 12 between the receptacle 23,1 is constructed in form of a cellular wheel sluice 24, the cellular wheel of which rotates in direction of the arrow 25. Such a cellular wheel sluice may also replace the gate valve disposed between the receptacles 1,13. When seen in direction of rotation (arrow 25) of the cellular wheel, the cell of the cellular wheel 24 preceding the discharge opening 10 is connected by means of a line 26 to the apparatus 19 for evacuation or gas-introduction, so that, therefore, the pre-comminuted material discharged from the receptacle 23 can be already evacuated or brought into contact with a protective gas, before it is introduced into the receptacle 1. A further line 27 may be conducted to the cells disposed in front of the discharge opening 10, when seen in rotation direction of the arrow 25, for the purpose of evacuation of these cells and thereby to enhance sucking-on of the synthetic plastics material from the receptacle 23.

Whereas within the embodiment described heretofore the receptacles or their discharge openings and intake openings are always disposed at least substantially at the same level and the conveyance of the synthetic plastics material from the one receptacle into the following receptacle is effected by this centrifugal force exerted from the tool 5, assisted by the vacuum in the next following receptacle or in the cellular wheel sluice, shows FIG. 3 an embodiment in which two receptacles 1,13 are disposed at different levels, the receptacle 13 being disposed at a lower level than the receptacle 1. Since the tube piece 12 is disposed horizontally, the intake opening 14 of the receptacle 13 is brought into the middle section of the side wall 9. This has as a consequence that the transport and mixing of the synthetic plastics material from the receptacle 1 into the receptacle 13 is assisted by gravity action. This can be increased by inclining the tube piece 12 towards the receptacle 13.

In FIGS. 4 and 5, the area of the shut-off means 20 is shown in an enlarged scale. FIG. 4 shows that the discharge opening 10 of the receptacle 1 has an enlargement 28 at the arriving side of the tool 5, which is formed as a pocket having a sickle-shaped cross section (seen in top view, FIG. 4). The intake opening 14 of the following receptacle 13 comprises an analogous enlargement 29, however, this enlargement 29 is disposed at the leaving side of the tool 5. The two enlargements 28,29, therefore, are disposed opposite each other—if desired mirror-inverted,—as long as the two tools 5 rotate in the same direction in the receptacles 1,13 what must not necessarily be so. These pocket-like enlargements enhance the inflow behaviour or outflow behaviour of the material streaming in direction of the arrows 13, so that the streaming resistance through the tube piece 12 is decreased. Of course, also here a sluice, for example in form of the cellular wheel sluice 24, may be used instead of the gate valve for the shut-off means 20.

In order to avoid blocking in the tube piece 12, the distance T (FIG. 5) at which the gate plate 21 is spaced apart from the wall 9 of the preceding receptacle, should be small. It has been shown as suitable to dispose the gate plate 21 at the location at which the pocket-like enlargement 22 shows its greatest depth. Therefore, the gate plate 21 generally is disposed excentrically with respect to the center between the two receptacles 1,13.

The embodiment according to FIG. 2 enables it to maintain different operation conditions in the two receptacles 1,13 via the lines 18, for example a vacuum in the receptacle 1 and introduction of a protective gas in the receptacle 13, or vice versa. However, it is of course also possible to maintain a vacuum in both receptacles 1,13, however with different degrees of evacuation, and in doing so, generally the vacuum in the downstream receptacle 13 is adjusted at a greater value than in the upstream receptacle 1. In such a case, namely, the treated material is sucked-in into the downstream receptacle, when the shut-off means 20 is opened. This holds also if the shut-off means 20 is formed as a cellular wheel sluice 24, however, within a cellular wheel sluice 24 the introduction of the material into the downstream receptacle does not take place so suddenly as if a shut-off means 20 is opened which is formed as a gate valve.

It would be also possible to connect more than one downstream receptacle 13 to a common upstream receptacle 1, for the purpose of increasing the capacity of the plant. If this is desired, different operation conditions can be maintained via the line 28 in the downstream receptacles 13.

In addition, the jacket of each receptacle can be heated or cooled, for example by means of heating coils or cooling coils or by means of a double jacket, By this, also different temperature conditions can be maintained in the individual receptacles.

Further, it would be possible to connect more than one discharge worm 16 to one or more of the downstream receptacles 13, and to feed more than one extruder plant from the receptacle 13.

Further, it would be possible to dispose in some or all of the receptacles more than one rotating tool 5, for example two tools disposed adjacent each other.

What is claimed is:

1. Apparatus for treating thermoplastic synthetic plastic material comprising:

a first receptacle having an intake opening in an upper region thereof and an outlet opening in a lower region thereof;

conveyor means for conveying material into the intake opening of the first receptacle;

a second receptacle having an intake opening and an outlet opening in a lower region of a sidewall thereof;

a mixing tool mounted in said second receptacle for mixing the material in the second receptacle;

a tube member connecting the outlet opening of the first receptacle to the intake opening of the second receptacle, said tube guiding material discharged from the first receptacle into the second receptacle;

means disposed in said tube member for creating an air tight closure between said first receptacle and said second receptacle, said means comprising a gate movable in said tube member between a first closed position and a second open position means for moving the gate between said open and closed positions;

a worm housing having an inlet opening connected to the outlet opening of the second receptacle;

a worm disposed in the worm housing for conveying material out of the second receptacle;

a gas line connected to the second receptacle; and a pump connected to said gas line for moving gas through said gas line, said pump being cooperative with said gate for controlling an atmosphere inside said second receptacle.

2. The apparatus of claim 1 wherein the first receptacle is positioned at a higher elevation than the second receptacle.

3. The apparatus of claim 1 wherein the first receptacle and the second receptacle are positioned at the same elevation.

4. The apparatus of claim 1 wherein said outlet opening of said first receptacle includes an enlargement.

5. The apparatus of claim 4 wherein said enlargement is sickle shaped.

6. The apparatus of claim 4 wherein said gate is disposed adjacent to the outlet opening near the bottom of the enlargement.

7. The apparatus of claim 1 wherein said intake opening of said second receptacle includes and enlargement.

8. The apparatus of claim 7 wherein said enlargement is sickle shaped.

9. The apparatus of claim 1 wherein said first and second receptacles can be heated and cooled independently of each other.

10. The apparatus of claim 1 wherein said second receptacle has a vertical axis and said mixing tool is rotatably mounted in said second receptacle for rotation about said vertical axis, said mixing tool being further operative for comminuting said material in said second receptacle.

11. Apparatus for treating thermoplastic synthetic plastic material comprising:

a first receptacle having an intake opening in an upper region thereof and an outlet opening in a lower region thereof;

conveyor means for conveying material into the intake opening of the first receptacle;

a second receptacle having an intake opening and an outlet opening;

a mixing tool mounted in the second receptacle for mixing material in the second receptacle;

a first tube member connecting the outlet opening of the first receptacle to the intake opening of the second receptacle;

means disposed in said first tube member for creating an air tight closure between said first receptacle and said second receptacle;

a third receptacle having an intake opening and an outlet opening in a lower region of a sidewall thereof;

a mixing tool mounted in said third receptacle for mixing the material in the third receptacle;

a second tube member connecting the outlet opening of the second receptacle to the intake opening of the third receptacle, said tube guiding material discharged from the second receptacle into the third receptacle;

means disposed in said second tube member for creating an air tight closure between said second receptacle and said third receptacle, said means comprising a gate movable in the second tube member between a first closed position and a second open position;

means for moving the gate between said open and closed positions;

a worm housing having an inlet opening connected to the outlet opening of the third receptacle;

a worm disposed in the worm housing for conveying material out of the third receptacle;

a first gas line connected to the second receptacle;

a second gas line connected to said third receptacle; and a pump connected to said first and second gas lines for moving gas through said gas lines, said pump being cooperative with said closure means in said first tube member and said gate in said second tube member for independently controlling atmospheres inside said second and third receptacles.

12. The apparatus of claim 11 wherein the second receptacle is positioned at a higher elevation than the third receptacle.

13. The apparatus of claim 11 wherein the first, second and third receptacles are positioned at the same elevation.

14. The apparatus of claim 11 wherein said outlet opening of said second receptacle includes an enlargement.

15. The apparatus of claim 14 wherein said enlargement is sickle shaped.

16. The apparatus of claim 14 wherein said gate is disposed adjacent to the outlet opening near the bottom of the enlargement.

17. The apparatus of claim 11 wherein said intake opening of said third receptacle includes and enlargement.

18. The apparatus of claim 17 wherein said enlargement is sickle shaped.

19. The apparatus of claim 11 wherein said second and third receptacles can be heated and cooled independently of each other.

20. The apparatus of claim 11 wherein said second and third receptacles have a vertical axis and said respective mixing tools are rotatably mounted in said second and third receptacles for rotation about said vertical axes, said mixing tools being further operative for comminuting said material in said second and third receptacles.

* * * * *